May 8, 1928.
F. D. SAYLOR
FLEXIBLE CONDUIT FOR ELECTRIC WIRES
Filed July 20, 1925
1,668,699
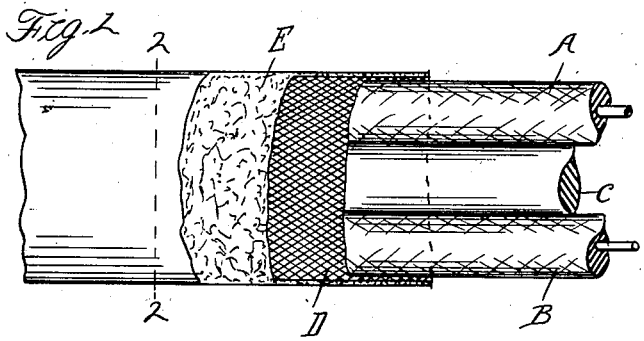
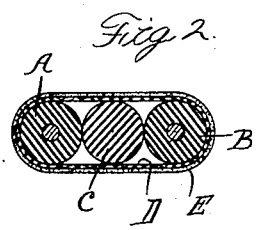
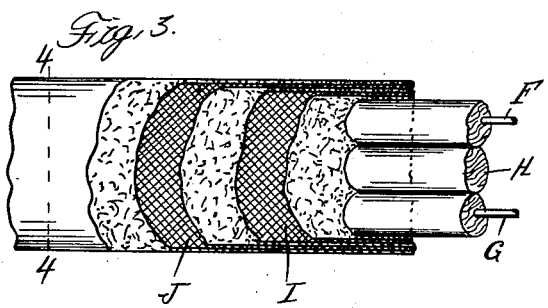
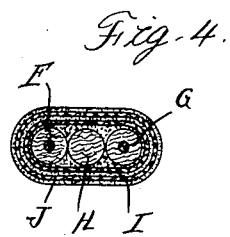
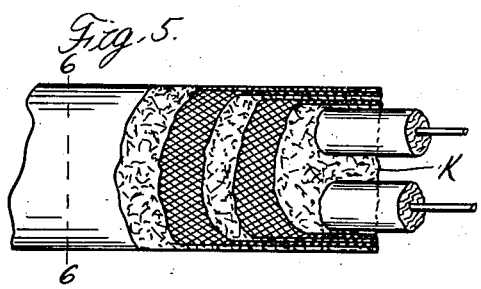
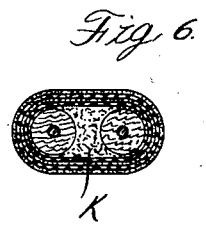
Inventor
Frank D. Saylor
By Whittemore Hulbert Whittemore Belknap
Attorneys Patented May 8, 1928.

1,668,699

UNITED STATES PATENT OFFICE.

FRANK D. SAYLOR, OF DETROIT, MICHIGAN.

FLEXIBLE CONDUIT FOR ELECTRIC WIRES.

Application filed July 20, 1925. Serial No. 44,905.

The invention relates to protective conduits for electric wires constructed in such a manner as to be suitable for use in the wiring of buildings for electrical purposes. In order to minimize the possibility of the wiring becoming defective after it has been installed it is necessary that the conduit or protective coating be hard, durable, insulating, fire-proof, water-proof and vermin-proof. My invention contemplates a construction which will meet with these requirements.

In the drawings:

Figure 1 is a side view of a conduit or cable embodying my invention, parts of the coverings being broken away to show the interior construction;

Figure 2 is a cross section on the line 2—2 of Fig. 1;

Figure 3 is a view similar to Figure 1 of a modified construction;

Figure 4 is a cross section on the line 4—4 of Fig. 3;

Figure 5 illustrates still another modification; and

Figure 6 is a cross section on the line 6—6 thereof.

The conduit made in accordance with my invention consists of a layer of fabric impregnated or coated with a composition containing a hard substance forming a durable exterior covering. The particular composition which I have found most desirable contains Portland cement as the principal constituent, together with a suitable binding agent for causing the adherence of the cement to the underlying material. As an example of a suitable binding agent, I have found that paste or glue such as is used in securing together the edges of paper bags and similar articles is very satisfactory and this material is commercially obtainable under the name of "Wonder Gum" as a powdered substance.

In preparing this composition it is preferable to use one part by weight of the highest grade fine Portland cement to which is added two parts of a solution containing the binder, the mixture then being thoroughly agitated until it is of a uniform consistency. The solution may be prepared by adding two parts of warm water to one part of "Wonder Gum" or equivalent substance until entirely dissolved. The composition is applied to the fabric either by dipping or using a brush.

As an example of one embodiment of my invention Figure 1 illustrates a cable comprising the two insulated conductors A and B separated by a rubber spacer C and surrounded by a fabric layer D. The latter is covered on the exterior with the composition E which sets in a few hours after application forming a hard durable covering.

Another example of my electrical conduit is shown in Figure 3 where the insulated wires F and G are asbestos covered and are separated by the asbestos spacer H which is also covered with the composition above described. The assembly is surrounded by a layer of open weave fabric I impregnated with the composition and is provided with a second or outer covering of a finer weave fabric J, the latter being also coated with the composition. If it is desired to make the construction more resistant to water the cable before being covered with the outer fabric layer can be treated with pitch after which the outside covering of the fabric and composition can be applied.

The modification illustrated in Figure 5 is similar to that shown in Figure 3, except that in this case the asbestos spacer H is eliminated and the insulated wires are separated by the composition alone. This material when fully hardened forms in itself, a good spacing member designated by the letter K.

It will be obvious that various other constructions may be used, all of which can be protected with the composition as hereinbefore described. The conduit or cable constructed in accordance with my invention is of great utility and provides a product which is hard, flexible, fire-proof, durable and vermin-proof.

What I claim as my invention is:—

1. A flexible cable comprising a pair of insulating conductors, a spacer between said conductors, an open weave fabric surrounding said conductors and spacer and impregnated with a composition containing Portland cement, and an outer finer weave fabric covering coated with said composition.

2. A flexible cable comprising a pair of insulated wires, a cylindrical spacer between said insulated wires coated with a composition containing Portland cement and a binding agent, an open weave fabric surrounding said wires and spacer and impregnated with said composition, and a second or outer fabric covering of finer weave, said last mentioned covering being also treated on its exterior surface with said composition.

3. A flexible protective casing for electric wires comprising a fabric covering impregnated with a mixture composed of one part cement and two parts gum solution.

In testimony whereof I affix my signature.

FRANK D. SAYLOR.